C. W. LEA.
HOE HANDLE.
APPLICATION FILED NOV. 5, 1920.
1,390,797.                                                     Patented Sept. 13, 1921.
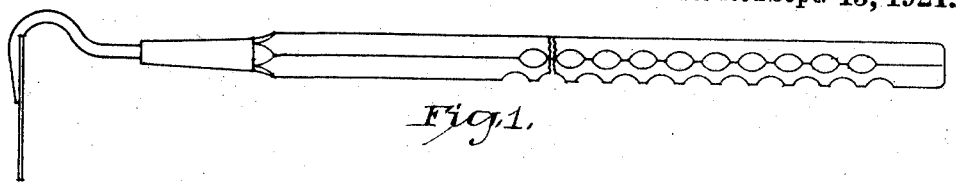
Fig. 1.
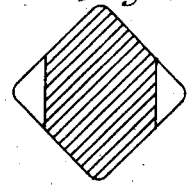    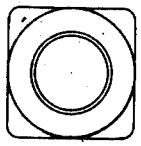    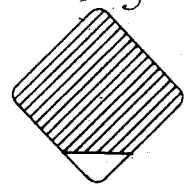
Fig. 5.       Fig. 6.       Fig. 7.
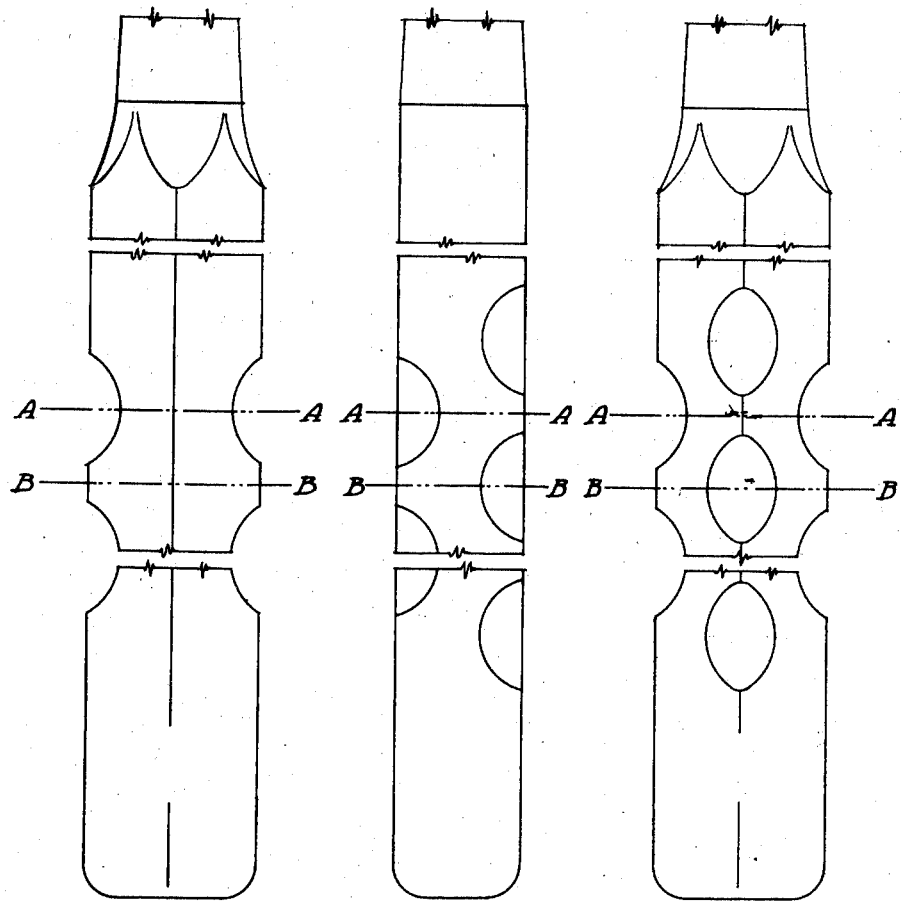
FIG. 2.        FIG. 3.        FIG. 4.
Charles William Lea
INVENTOR.

UNITED STATES PATENT OFFICE.

CHARLES WILLIAM LEA, OF TORONTO, ONTARIO, CANADA.

HOE-HANDLE.

1,390,797.        Specification of Letters Patent.    Patented Sept. 13, 1921.

Application filed November 5, 1920. Serial No. 422,071.

*To all whom it may concern:*

Be it known that I, CHARLES WILLIAM LEA, a citizen of the Dominion of Canada, residing at the city of Toronto, in the county of York and Province of Ontario, have invented a new and useful Hoe-Handle, of which the following is a specification.

My invention relates to improvements in hoes whereby the hoe itself has the three edges thereof sawlike or notched the two side edges to form right angles with the bottom edge and the handle thereof composed of a square piece of wood with finger rests or curved notches cut on three edges thereof. The plain unnotched edge to be uppermost when the hoe is held in a position for use and the objects of my improvements are:

(1) By means of the sawlike or notched teeth on the three sides of the blade to provide superior cutting edges for the said hoe so as to improve its weed killing and ground disturbing qualities and to enable it to more readily cut through hard or thick roots or weeds. It can be used alternately by a scraping or by a slicing or cutting sidewise movement. Where it is desired to use a shorter cutting or scraping surface the side edges similarly notched and set at right angles to the lower edge will afford all the advantages of the lower edge.

(2) By means of the notches or finger rests on the handle to provide a superior hold thereon for the hand so as to enable the same to be more readily operated and to enable the ground resistance or the resistance afforded by weeds or other growth to be more readily overcome and to enable the user to better employ a slicing or sidewise movement for the cutting of thick or hard weeds. The operator will be also assisted in the use of the side edges and the hoe handle can be held by means of these finger rests in any required position without danger of its slipping or turning.

I attain these objects by means of the design illustrated in the accompanying drawing in which—

Figure 1 is an elevational view of the hoe.

Fig. 2 is a top view of the improved hoe handle.

Fig. 3 is a side view of the same.

Fig. 4 is a bottom view of the same.

Fig. 5 is a section taken on the line A—A of Figs. 2, 3 or 4.

Fig. 6 is an end view of the ferrule.

Fig. 7 is a section taken on the line B—B of Figs. 2, 3 or 4.

I am aware that prior to my invention hoes have been made with circular handles and plain edges along the same designs. I therefore do not claim such a combination broadly but I claim—

The combination with a hoe, of a handle square in cross section, as distinguished from a handle circular in cross section, with finger rests cut on three edges thereof.

CHARLES WILLIAM LEA.